(12) United States Patent
Yata et al.

(10) Patent No.: US 8,870,441 B2
(45) Date of Patent: Oct. 28, 2014

(54) APPARATUS AND METHOD FOR PLASTIC EXTRUSION

(75) Inventors: Kyohei Yata, Hiroshima (JP); Seiji Takamoto, Hiroshima (JP); Fumio Kobayashi, Hiroshima (JP); Shigeki Inoue, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 386 days.

(21) Appl. No.: 13/232,025

(22) Filed: Sep. 14, 2011

(65) Prior Publication Data
US 2012/0081989 A1 Apr. 5, 2012

(30) Foreign Application Priority Data

Sep. 30, 2010 (JP) .................................. 2010-220904

(51) Int. Cl.
| | |
|---|---|
| *B01F 7/00* | (2006.01) |
| *B29B 7/00* | (2006.01) |
| *B29C 47/66* | (2006.01) |
| *B29C 47/60* | (2006.01) |
| *B29C 47/08* | (2006.01) |
| *B29C 47/76* | (2006.01) |
| *B29C 47/40* | (2006.01) |
| *B29C 47/00* | (2006.01) |
| *B29C 47/38* | (2006.01) |

(52) U.S. Cl.
CPC ............. *B29C 47/76* (2013.01); *B29C 47/40* (2013.01); *B29C 47/662* (2013.01); *B29C 47/0009* (2013.01); *B29C 47/6056* (2013.01); *B29C 47/0847* (2013.01); *B29C 47/404* (2013.01); *B29C 47/666* (2013.01); *B29C 47/38* (2013.01)

USPC ............................................ 366/75; 366/76.93

(58) Field of Classification Search
USPC .................... 366/79, 81, 85, 75, 82, 76.93, 96
See application file for complete search history.

(56) References Cited

U.S. PATENT DOCUMENTS

| | | | | |
|---|---|---|---|---|
| 3,327,348 | A * | 6/1967 | Roehlig et al. | ................ 366/76.9 |
| 3,382,536 | A * | 5/1968 | Fritsch et al. | .................... 366/85 |

(Continued)

FOREIGN PATENT DOCUMENTS

| | | |
|---|---|---|
| DE | 23 51 328 A1 | 4/1975 |
| EP | 0 392 860 A2 | 10/1990 |

(Continued)

OTHER PUBLICATIONS

Extended European Search Report, issued by the European Patent Office in corresponding European Application No. 11181084.2 on Jan. 17, 2012.

(Continued)

*Primary Examiner* — Tony G Soohoo
*Assistant Examiner* — Anshu Bhatia
(74) *Attorney, Agent, or Firm* — Sughrue Mion, PLLC (57) ABSTRACT

An object of the invention is to improve capacity of process and not require a vent portion by an upper polygonal groove and a transition portion provided to a transport cylinder.

A plastic extrusion method and apparatus according to the invention is a method and a configuration, in which an upper polygonal groove and a transition portion are integrally or separately provided to a transport cylinder so as to increase a frictional coefficient of an inner wall of the cylinder, to increase transport efficiency of a plastic raw material by a screw, and to allow at least gas, etc., pass toward a hopper side without using a vent portion.

9 Claims, 5 Drawing Sheets

(56) References Cited

U.S. PATENT DOCUMENTS

| | | | | |
|---|---|---|---|---|
| 4,562,973 | A | * | 1/1986 | Geng .......................... 241/260.1 |
| 5,088,914 | A | * | 2/1992 | Brambilla ....................... 366/81 |
| 5,516,205 | A | * | 5/1996 | Oda et al. ........................ 366/75 |
| 7,380,973 | B2 | * | 6/2008 | Goedicke et al. ............... 366/85 |

FOREIGN PATENT DOCUMENTS

| JP | 51-020080 U | 2/1976 |
|---|---|---|
| JP | 6238130 U | 3/1987 |
| JP | 02-17321 U | 2/1990 |
| JP | 5104610 A | 4/1993 |
| JP | 6-278192 A | 10/1994 |
| JP | 07205142 A | 8/1995 |
| JP | 2004195675 A | 7/2004 |
| JP | 2006-026949 A | 2/2006 |

OTHER PUBLICATIONS

Japanese Office Action dated Sep. 11, 2012 issued by the Japanese Patent Office in corresponding Japanese Patent Application No. 2010-220904.

* cited by examiner

APPARATUS AND METHOD FOR PLASTIC EXTRUSION

This application claims priority from Japanese Patent Application No. 2010-220904 filed on Sep. 30, 2010, the entire subject-matter of which is incorporated herein by reference.

BACKGROUND OF THE INVENTION

1. Field of the Invention

The invention relates to an apparatus and method for plastic extrusion. Specifically, the invention relates to a novel, improved apparatus and method for plastic extrusion, in which a transition portion and an upper polygonal groove integrally or separately provided on the entire inner surface of a transport section cylinder improves the processing ability and enables at least inert gas components and volatile components from a plastic to be removed through a hopper.

2. Description of the Related Art

Figure 6:
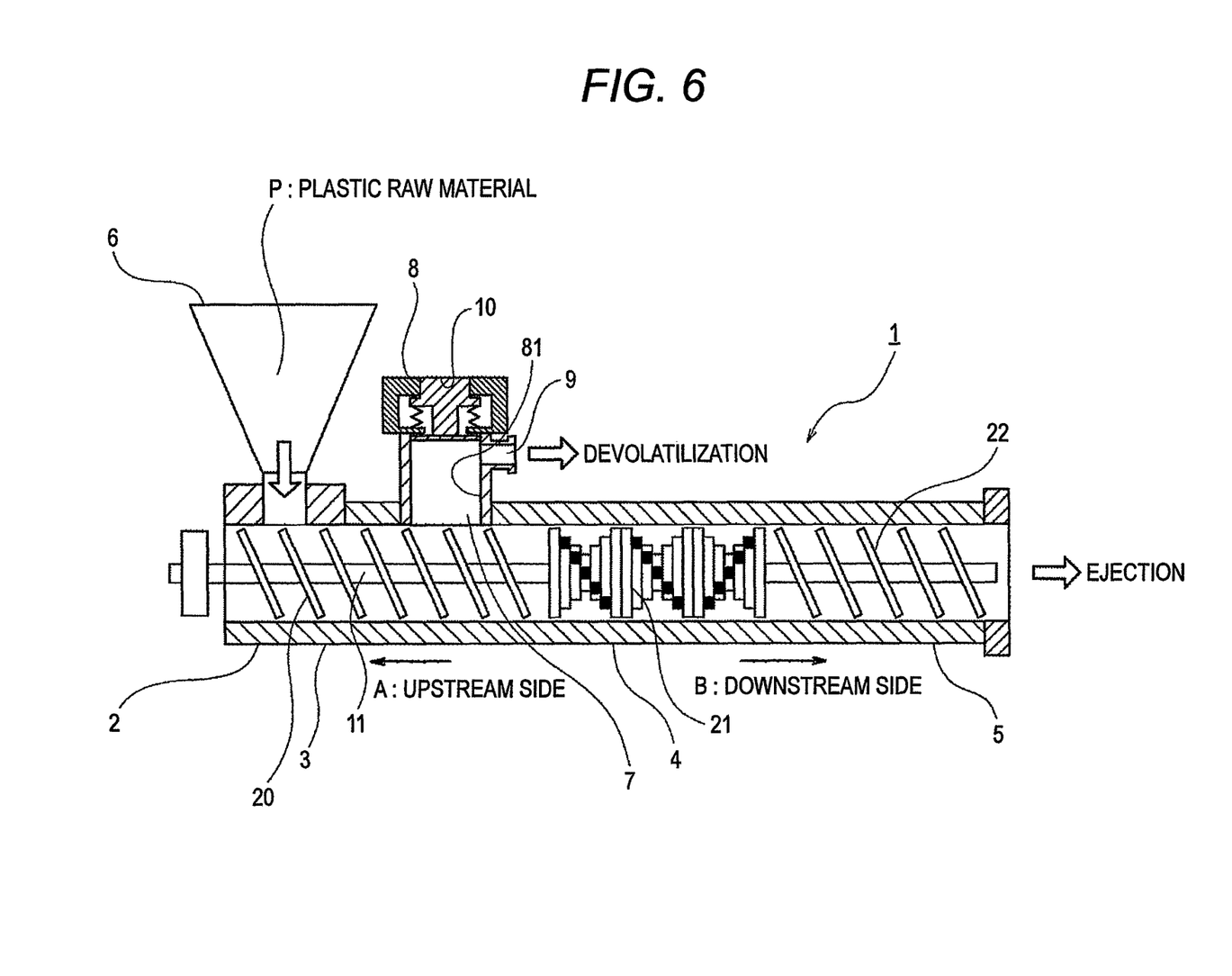
FIG. 6 is a cross-sectional view of a related-art plastic extrusion apparatus.
Figure 7:
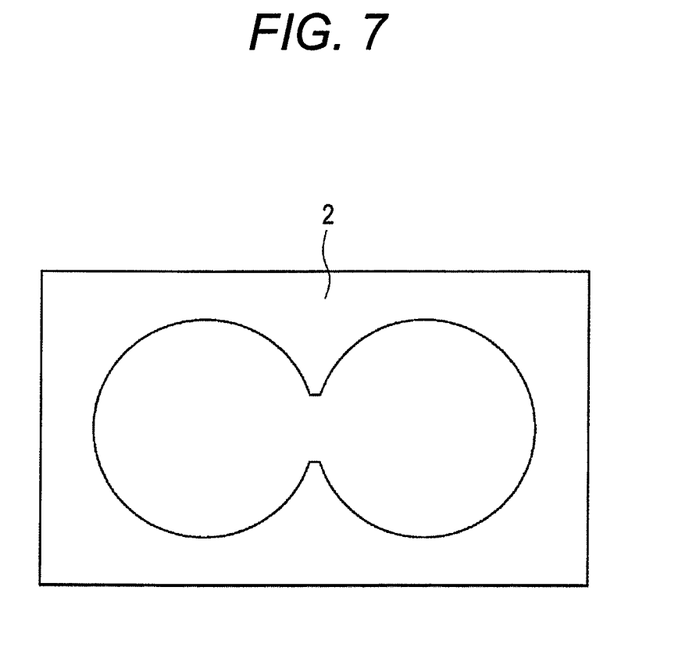
FIG. 7 is a front view of a cylinder shown in FIG. 6.
Figure 8:
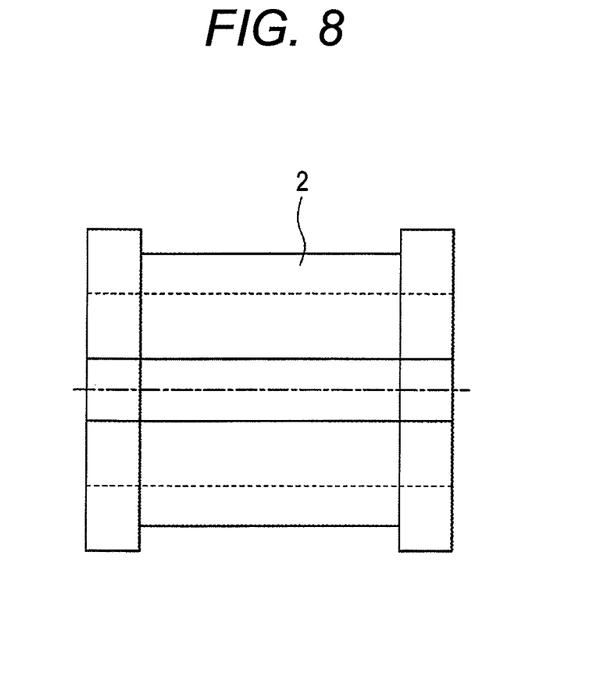
FIG. 8 is a side view of FIG. 7.

JP-A-06-278192, as depicted in FIGS. 6 to 8, describes a gas removing structure of a related-art plastic extrusion apparatus.

Specifically, a twin screw extruder is indicated as reference 1 in FIG. 6. The twin screw extruder 1 has a cylinder 2 including a transport section cylinder 3, a kneading section cylinder 4, and a releasing section cylinder 5, which are arranged from an upstream side A towards a downstream side B.

The upstream side A of the cylinder 2 has a hopper 6 installed for supplying a plastic raw material P into the cylinder 1. The downstream side B of the hopper 6 of the cylinder 1 has an inner tube 81 of a degassing device 8 installed as a vent portion installed on a vent opening 7.

The degassing device 8 includes a devolatilization opening 9 and a header 10 of a spring urging type, which are configured to be able to open or close.

A pair of screws 11 is rotatably installed in the cylinder 1, and has a transport section screw 20, a kneading section screw 21 and a releasing section screw 22, from the upstream side A towards the downstream side B.

An extrusion process in which a plastic raw material P is kneaded by the twin screw extruder 1 will be described.

First, the plastic raw material P is supplied from the hopper 6 to the transport section cylinder 3 and is conveyed towards the downstream side of the twin screw extruder 1 by rotation of the screw 11. The conveyed plastic raw material P is plasticized, melted and kneaded by heat energy supplied from the cylinder 2, which may be heated and cooled, and by shear stress of the mixing section screw 21. When the plastic raw material P is supplied to the hopper 6, conveyed towards the downstream B of the extruder 1 by rotation of the screw 11, and plasticized, melted and kneaded by the kneading section cylinder 4, the kneading section cylinder 4 is fully charged with the molten plastic and then sealed. Then, kneaded air or inert gas components mixed with the plastic raw material P, volatile components remaining within the plastic raw material, etc, flow backwards to the side of the hopper 6 having lower pressure. These gas components are removed by the degassing device 8 because they compromise the conveying ability of the screw 11. At the same time, however, the degassing device 8 sucks a portion of the raw material. Since the sucked raw material is attached on the surface of the inner tube 81, the attached raw material is removed by force by means of shaking the inner tube 81 while knocking the header 10 with, for example, a manually-operated or motor-operated rammer or air knocker, before the raw material was carbonized.

The gas removal structure of the above-described related-art plastic extrusion apparatus has been exposed to the following drawbacks.

When a raw material is of a powder type and has a small particle diameter, or when the raw material contains a large amount of gas components, the powder escapes the inner tube of the degassing device and is removed, so that processing ability becomes deteriorated. Moreover, since the gas removal structure requires a vent portion, an intake source from an outside, such as a vacuum pump, becomes necessary in addition to accessory components including a motor or metallic parts of specific use. Thus, the cost of equipment is increased.

The invention is to solve the aforementioned problems. For example, the present invention may process a large ejection amount without compromising the processing ability even when a raw powder has a small particle diameter or contains a large amount of gas components.

According to one illustrative aspect of the invention, there is provided a plastic extrusion method comprising: preparing a cylinder comprising a transport section cylinder, a kneading section cylinder and a releasing section cylinder, wherein a screw is installed in the cylinder and comprises a transport section screw, a kneading section screw and a releasing section screw; supplying a plastic raw material into the cylinder from a hopper of a raw material supplying portion at an upstream side of a transport section cylinder; plasticizing and kneading the plastic raw material; and extruding the plasticized and kneaded material from the releasing section cylinder, wherein the transport section cylinder comprises an upper polygonal groove and a transition portion, the transition portion being arranged at the downstream side of the upper polygonal groove and being configured as a shape in which the upper polygonal groove gradually disappears, and wherein in the supplying the plastic raw material, the plastic extrusion method comprises releasing at least inert gas components and volatile components toward the hopper when the plastic raw material passes through the upper polygonal groove. The cylinder comprises no vent portion for releasing the inert gas components and volatile components to an outside. The upper polygonal groove comprises at least four grooves, and a depth H of the at least four grooves satisfies 0<H≤0.1 D, where D is the inner diameter of the cylinder. The screw is configured as twin screws. The screw is configured as twin screws turning inwards in different directions. The upper polygonal groove is provided in a separate upper polygonal cylinder. The upper polygonal groove and the transition portion are provided in a separate transition cylinder. The upper polygonal groove and the transition portion are integrally incorporated in the cylinder.

According to another illustrative aspect of the invention, there is provided a plastic extrusion apparatus for supplying a plastic raw material into a cylinder from a hopper of a raw material supplying portion at an upstream side of a transport section cylinder, for plasticizing and kneading the plastic raw material and for extruding the plasticized and kneaded material from a releasing section cylinder, wherein the cylinder comprises the transport section cylinder, a kneading section cylinder and the releasing section cylinder, wherein a screw is installed in the cylinder and comprises a transport section screw, a kneading section screw and a releasing section screw is installed in the cylinder, wherein the transport section cylinder comprises an upper polygonal groove and a transition portion, the transition portion being arranged at a downstream side of the upper polygonal groove and being configured as a shape in which the upper polygonal groove gradually disappears, and wherein the plastic extrusion apparatus is configured to release at least inert gas components and volatile components toward the hopper when the plastic raw material passes through the upper polygonal groove. The cylinder comprises no vent portion for releasing the inert gas components and volatile components to an outside. The upper polygonal groove comprises at least four grooves, and a depth H of the grooves satisfies $0 < H \leq 0.1\,D$, where D is the inner diameter of the cylinder. The screw is configured as twin screws. The screw is configured as twin screws turning inwards in different directions. The upper polygonal groove is provided in a separate upper polygonal cylinder. The upper polygonal groove and the transition portion are provided in a separate transition cylinder. The upper polygonal groove and the transition portion are integrally incorporated in the cylinder.

A plastic extrusion method and apparatus according to the invention may have the following effects accomplished by the aforementioned structures.

Specifically, a plastic extrusion apparatus according to the invention is configured to supply a plastic raw material into a cylinder from a hopper of a raw material supplying portion at the upstream side of a transport section cylinder, to plasticize and knead the plastic raw material and to extrude the plasticized and kneaded material from a releasing section cylinder. The cylinder includes at least the transport section cylinder, a kneading section cylinder and the releasing section cylinder, and a screw including at least a transport section screw, a kneading section screw and a releasing section screw is installed in the cylinder. Furthermore, the transport section cylinder includes an upper polygonal groove and a transition portion, the transition portion being arranged at the downstream side of the upper polygonal groove and being configured as a shape in which the upper polygonal groove gradually disappears. When the plastic raw material passes through the upper polygonal groove, at least inert gas components and volatile components escape through the hopper to the outside. According thereto, a frictional coefficient increases in the cylinder inner surface by an upper polygonal groove formed on the inner surface of the transport section cylinder of the extruder, thereby increasing the driving force and subsequently the processing ability.

Furthermore, when a plastic raw material passes through the upper polygonal groove, the material enters, and is then compressed at, the polygonal-shaped groove portion of the upper polygonal groove, and an apparent volume density of the plastic raw material increases accordingly. Therefore, since inert gas components, kneaded air, volatile components remaining within the plastic raw material, etc, pass through the groove and efficiently move to the side of the hopper having a lower pressure, the apparatus prohibits gas from passing through a screw channel, thereby maintaining the conveying ability of the screw.

Also, since the cylinder does not require a vent portion therein, additional accessory device such as a vacuum pump for connecting with such a vent portion is not required at all. All that is required is to fabricate the inner wall of the cylinder. As such, the cost of additional equipment may be reduced with simplified maintenance and improved reliability achieved.

The upper polygonal groove is configured to include at least four grooves, and the depth of the grooves satisfies $0 < H \leq 0.1\,D$, where D is the inner diameter of the cylinder. Therefore, a frictional coefficient in the cylinder inner wall may be sufficiently obtained as necessary.

The upper polygonal groove is configured in a separate upper polygonal cylinder. Therefore, the cylinder may be easily manufactured, and an upper polygonal cylinder may be so made as to have different frictional coefficients by the kind of a raw material.

Moreover, the upper polygonal groove and the transition portion are configured in a separate transition cylinder. Therefore, the cylinder may be easily manufactured, and a transition cylinder may be so made as to have different frictional coefficients by the kind of a raw material.

Furthermore, the upper polygonal groove and the transition portion are integrally configured in a cylinder. Therefore, the upper polygonal groove and the transition portion are manufactured integrally with the transport section cylinder, and the cost of process may be reduced accordingly.

DETAILED DESCRIPTION

An object of the invention is to provide an apparatus and method for plastic extrusion, in which a transition portion and an upper polygonal groove integrally or separately provided at the downstream side of a transport cylinder improves the capacity of process and enables at least inert gas components and volatile components from a plastic to be released through a hopper.

It will be now explained a preferred embodiment of an apparatus and method for plastic extrusion according to the present invention in reference to the accompanying drawings. Incidentally, the same reference is used for the same part as, or a part corresponding to, that of a related art.

Figure 1:
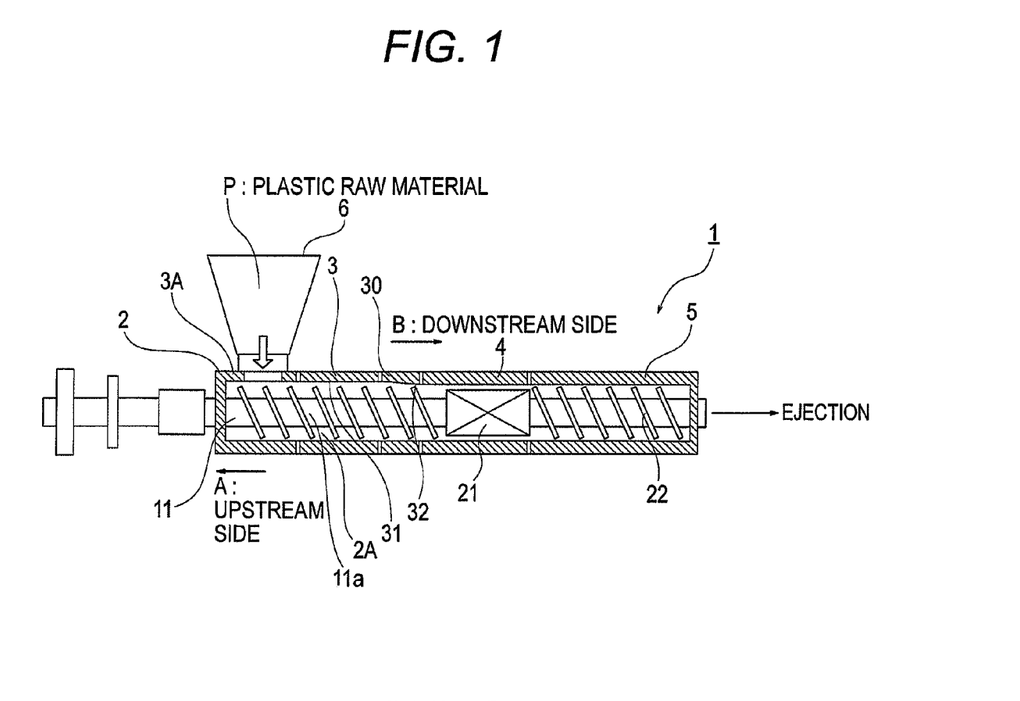
FIG. 1 is a cross-sectional view of a method and an apparatus for plastic extrusion according to the present invention.

In FIG. 1, a twin screw extruder is indicated by reference 1. A cylinder 2 of the twin screw extruder includes a transfer cylinder 3, a kneading section cylinder 4 and a releasing section cylinder 5, which are installed from an upstream side A towards a downstream side B.

At the upstream side A of the cylinder 2, a hopper 6 is installed on a raw material supplying portion 3A formed as an opening. Contrary to the related art, a vent portion is not installed at the downstream side B of the hopper 6.

Figure 2:
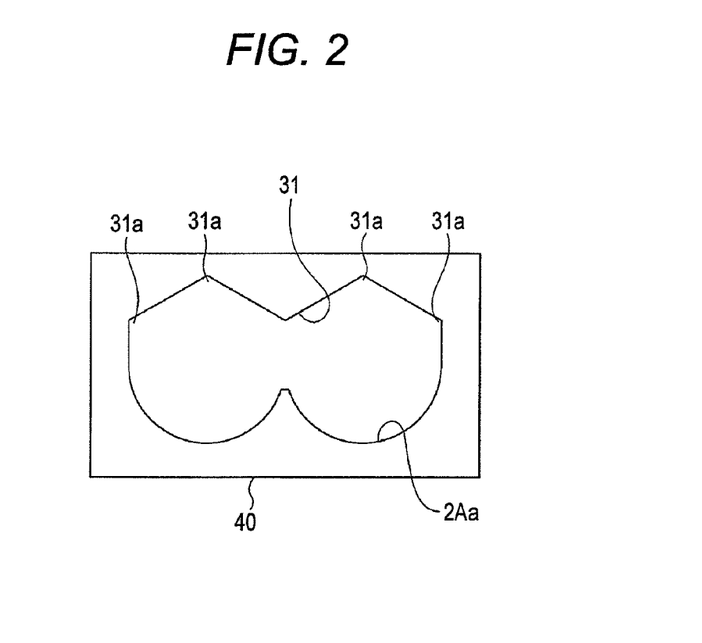
FIG. 2 is a front view of an upper polygonal cylinder used for the present invention.
Figure 3:
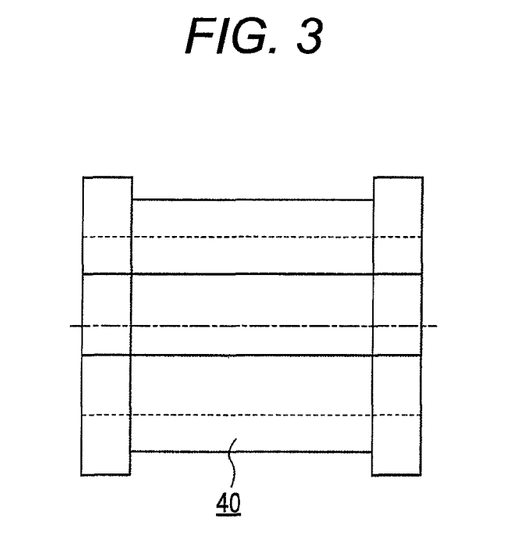
FIG. 3 is a side view of FIG. 2.

An inner hole 2A of the cylinder 2 has an upper polygonal groove 31, which is depicted in FIG. 2, formed over the entire length of the inner hole 2A beginning from the downstream end of the hopper 6. In the configuration shown in FIG. 1, a transition cylinder 30 is independently incorporated as a separate body at the downstream side B. The transition cylinder 30 has a configuration depicted in FIG. 4. In other words, the transport section cylinder 3 is identical to an upper polygonal cylinder 40 as described later.

Figure 4:
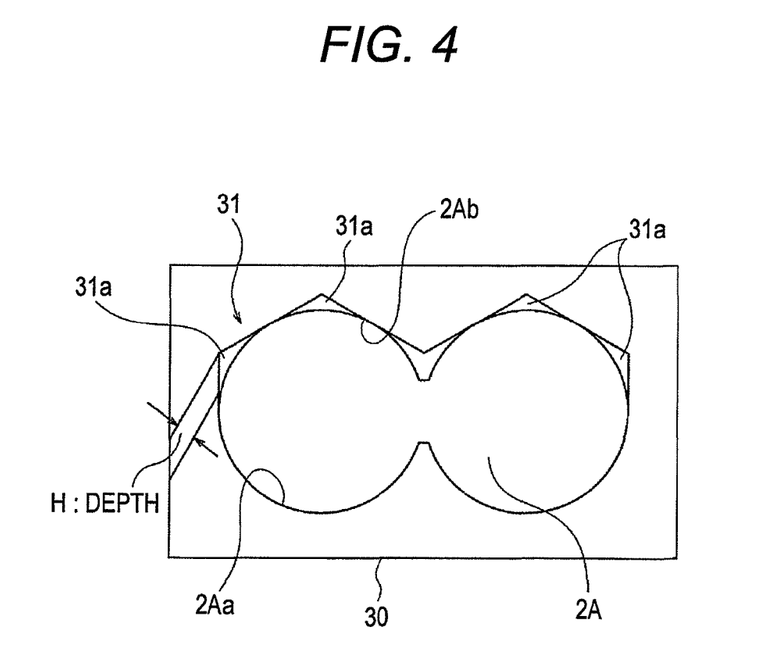
FIG. 4 is a front view of a transition cylinder used for the present invention.
Figure 5:
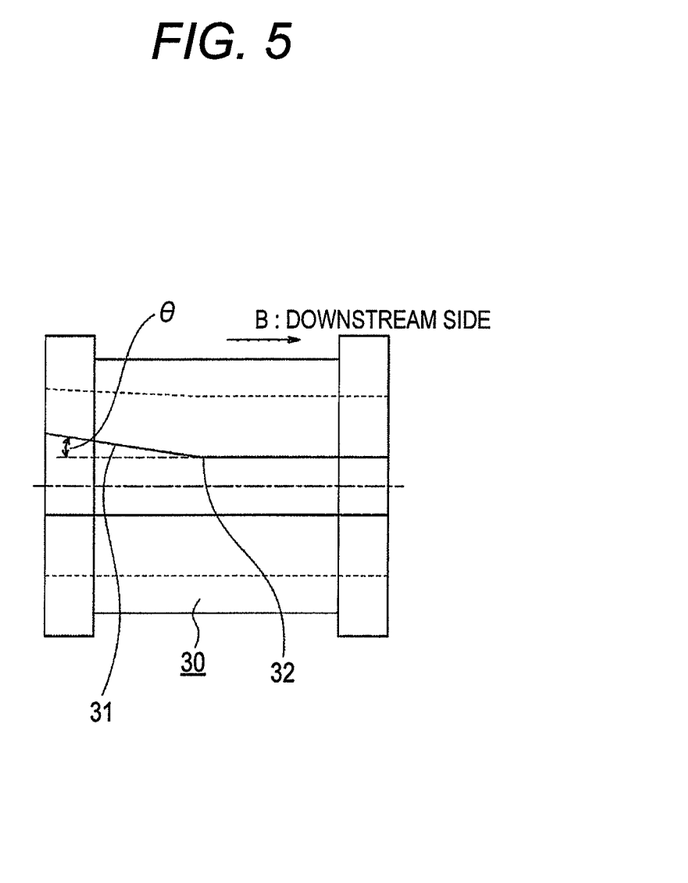
FIG. 5 is a side view of FIG. 4.

As illustrated in FIGS. 4 and 5, the transition cylinder 30 includes a lower part 2Aa and an upper part 2Ab of the inner hole 2A. The lower part 2Aa has a semi-circular shape, i.e., the half of a circle, and the upper part 2Ab is configured as an upper polygonal groove 31 having at least four grooves 31a. As illustrated in FIG. 5, the upper polygonal groove 31 is configured to form a down-slope towards the downstream side so as to disappear eventually. In other words, the down-slope formed by the upper polygonal groove 31 eventually disappears and the circular inner hole 2A is thus recovered.

Therefore, in FIG. 1, the transition cylinder 30 is arranged between the transport section cylinder 3 and the kneading section cylinder 4.

A twin screw 11 is installed within the inner hole 2A of the cylinder 2. The screw 11 is configured by a transport section screw 11a, a kneading section screw 21 and a releasing section screw 22. The transport section screw 11a corresponds to an upper polygonal cylinder 40 and a transition cylinder 30, the kneading section screw 21 corresponds to the kneading section cylinder 4, and the releasing section screw 22 corresponds to the releasing section cylinder 5.

When the transition cylinder 30 is integrally formed at the downstream side B of the upper polygonal cylinder 40 of FIG. 1, or when the upper polygonal cylinder 40, as shown in FIG. 2, which has only the upper polygonal groove 31, is installed as a separate body in the transport section cylinder 3, the same structure may be achieved as described above. Incidentally, it is preferable that the twin screw extruder 1 has inward turning in different directions.

It will be now explained that a plastic raw material P is plasticized and kneaded in the configuration of FIG. 1 as described above.

First, the plastic raw material P is supplied from the hopper 6, passes through the upper polygonal groove 31 and the transition portion 32 by rotation of the screw 11 inserted in the extruder 1, conveyed to the kneading section screw 21, plasticized and kneaded in the kneading section screw 21, and ejected from the front, or the side, of the front end of the extruder.

When the plastic raw material P passes through the upper polygonal groove 31 by rotation of the screw 11, the plastic raw material P enters the upper polygonal groove 31 and is compressed so that an apparent volume density of the plastic raw material P increases. Inert gas components mixed with the plastic raw material P or mixed air, or volatile components remaining in the plastic may pass through the upper polygonal groove 31 and efficiently flow towards the hopper 6 having a low pressure. As a result, gas is prohibited from passing through the screw channel of the extruder, and the conveying ability of the screw 11 is thus maintained. Accordingly, the capacity of process is not deteriorated even for a powder raw material having a small particle diameter or a raw material containing a large amount of gas components. Moreover, the upper polygonal groove 31 may increase the frictional coefficient of the inner wall of the cylinder by wedge effect, and the driving force is thus improved by the friction of the plastic raw material P. Therefore, an ejection amount may also be increased accordingly.

Since the upper polygonal cylinder 40 and the transition cylinder 30 arranged in the transport section cylinder 3 remain to have a conventional circular shape, the plastic raw material P is not stagnant by its own weight and can be conveyed by the screw 11. Furthermore, since a vent portion is not required, no additional accessory device such as a vacuum pump is necessary, and it is only required to fabricate the inner wall of the cylinder 11. Therefore, the cost of additional equipment can be significantly reduced.

Incidentally, although FIG. 1 illustrates that the transition cylinder 30 is provided as a separate body on the transport section cylinder 3, the same technical effect may also be achieved when the upper polygonal groove 31 and the transition portion 32 are configured by integrally forming with the transport section cylinder 3, or when the upper polygonal cylinder 40 is installed as a separate body in the transport section cylinder 3.

It will be now explained that the inventor performed the extrusion process with a plastic raw material using the extruder according to the invention.

In FIG. 1, two screws 11 are inserted into the cylinder 2, which may be heated and cooled, and are turning inwards in different directions. The two screws 11 are not engaged with each other.

Raw Material: HDPE (Powder)
Bulk Density: 0.4-0.46 g/cm2
Average Particle Size: 300-900 μmm
Cylinder Inner Diameter: 90 φmm
Processing Ability: 210 -560 kg/h
Rotational Speed of Screw: 280 rpm The transport section cylinder 3 including the upper polygonal cylinder 40 and the transition cylinder 30 at the downstream side B is compared, in terms of ability, with a related-art cylinder of a glasses type including a transport section cylinder 3 with L/D=2 and a transition cylinder 30 with L/D=1, where L is the length in an axis direction and D is the inner diameter of the cylinder.

The upper polygonal cylinder 40 has four polygonal grooves, and the depth of the grooves is 0.08 D, where D is the inner diameter of the cylinder.

The test result is shown in Table 1.

TABLE 1

Test result:

| Cylinder Shape | Feed Ability kg/h | Rotational Speed of Screw rpm | Feed Neck |
|---|---|---|---|
| Glasses Type (Annular Shape) | 423 | 280 | Yes |
| Upper Polygonal Shape | 517 | 280 | No |

As shown in Table 1 of the test result above, the related-art cylinder of a glasses type had a processing ability of 432 kg/h up to a marginal feed neck at a rotational speed of the screw of 280 rpm. In contrast, the cylinder according to the invention caused no feed neck with a processing ability of 517 kg/h at the same rotational speed of the screw of 280 rpm.

With respect to the depth of the grooves aforementioned, the depth H of the grooves satisfies $0 < H \leq 0.1$ D. In case of a hexagonal cylinder, which has the minimum number of angles, the groove depth may be defined as follows:

$H = D (1 - \cos 30)/2 \cos 30 \approx 0.08$ D ($\Rightarrow 0.1$ D), where D is the inner diameter of the cylinder.

Accordingly, the groove depth of a hexagonal cylinder is 0.1 D, and the groove depth of a polygonal cylinder having more than six sides satisfies $0 < H \leq 0.1$ D, because the groove depth is smaller than that in a hexagonal cylinder.

With respect to the slope angle of the taper in the transition cylinder 30, the angle θ of the slope or taper of the upper polygonal groove 31 in the transition cylinder 30 as illustrated in FIGS. 4 and 5 preferably satisfies the range of $0 < \theta \leq 22$ degrees.

Specifically, when the length of the tapered portion is L=0.25 D and the depth of the groove is H=0.1 D, the angle θ is 22 degrees as specified below:

$\tan \theta = 0.1$ D$/0.25$ D $\therefore \theta = 22$ degrees.

Since the groove depth, H=0.1 D, is the maximum depth of the groove, the angle θ of the tapered portion falls within the range of 0<θ≤22 degrees.

Although the design of L=0.25 D makes the length of the tapered portion the shortest, such a design is desirable when the design practice of a cylinder is considered because a cylinder is typically to be manufactured in the order of 0.25 D, 0.5 D, etc.

The method and apparatus for plastic extrusion according to the invention may apply to a solid plastic or a powder plastic as a plastic raw material.

What is claimed is:

1. A plastic extrusion method comprising:
   preparing a cylinder comprising a transport section cylinder, a kneading section cylinder and a releasing section cylinder, wherein a screw is installed in the cylinder and comprises a transport section screw, a kneading section screw and a releasing section screw;
   supplying a plastic raw material into the cylinder from a hopper of a raw material supplying portion at an upstream side of the transport section cylinder;
   plasticizing and kneading the plastic raw material; and
   extruding the plasticized and kneaded material from the releasing section cylinder,
   wherein the transport section cylinder comprises an upper polygonal groove and a transition portion, the upper polygonal groove beginning at a downstream end of the hopper, the transition portion being arranged at the downstream side of the upper polygonal groove and being configured as a shape in which the upper polygonal groove tapers downward so as to gradually disappear before reaching the kneading section cylinder, and
   wherein in the supplying the plastic raw material, the plastic extrusion method comprises releasing at least inert gas components and volatile components toward the hopper when the plastic raw material passes through the upper polygonal groove.

2. The plastic extrusion method according to claim 1, wherein the cylinder comprises no vent portion for releasing the inert gas components and volatile components to an outside.

3. The plastic extrusion method according to claim 1, wherein the upper polygonal groove comprises at least four grooves, and
   wherein a depth H of the at least four grooves satisfies 0 <H ≤0.1D, where D is the inner diameter of the cylinder.

4. The plastic extrusion method according to claim 1, wherein the screw is configured as twin screws.

5. The plastic extrusion method according to claim 1, wherein the screw is configured as twin screws turning inwards in different directions.

6. The plastic extrusion method according to claim 1, wherein the upper polygonal groove is provided in a separate upper polygonal cylinder.

7. The plastic extrusion method according to claim 1, wherein the upper polygonal groove and the transition portion are provided in a separate transition cylinder.

8. The plastic extrusion method according to claim 1, wherein the upper polygonal groove and the transition portion are integrally incorporated in the cylinder.

9. The plastic extrusion method according to claim 1, wherein the transition portion includes a lower part and an upper part, the lower part having a semi-circular shape, and the upper part having an upper polygonal groove shape.

* * * * *